L. H. BECHMAN.
TOOL SETTING DEVICE FOR STEREOTYPE PLATE BORING MACHINES.
APPLICATION FILED JUNE 5, 1916.

1,229,867.

Patented June 12, 1917.

Witnesses
Philip E. Barnes
Lemuel A. Fraser

Inventor
Louis H. Bechman
By Alexander & Dowell
Attys.

UNITED STATES PATENT OFFICE.

LOUIS H. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

TOOL-SETTING DEVICE FOR STEREOTYPE-PLATE-BORING MACHINES.

1,229,867.      Specification of Letters Patent.      Patented June 12, 1917.

Application filed June 5, 1916. Serial No. 101,707.

*To all whom it may concern:*

Be it known that I, LOUIS H. BECHMAN, a citizen of the United States, residing at Battle Creek, in the county of Calhoun and State of Michigan, have invented certain new and useful Improvements in Tool-Setting Devices for Stereotype-Plate-Boring Machines; and I hereby declare that the following is a full, clear, and exact description thereof, reference being had to the accompanying drawings, which form part of this specification.

This invention is a novel improvement in means for setting the cutters used for boring tubular stereotype printing plates in machines of the type shown in patents to Henry F. Bechman #1,129,947 and #1,129,948 of March 2, 1915. The object of the present invention is to enable the cutting tools to be quickly, truly and accurately adjusted so that they will truly and accurately bore the plates to exactly the desired internal diameter. The cutters are semi-automatically adjusted to working position by means of a gage and springs, the cutters when released adjusting themselves in the holder under the action of springs, and after then being securely fastened to the holder are ready to operate. This does away with manual handling and measuring when adjusting the cutters, and greatly facilitates the operation of trimming the plates and of resetting the cutters after sharpening the same, or when new cutters are to be put in the machine.

I will explain the invention as adapted for use in connection with the tubular stereotype plate boring and finishing machines shown and described in the aforesaid patents, with reference to the accompanying drawings in which.

Figure 1:
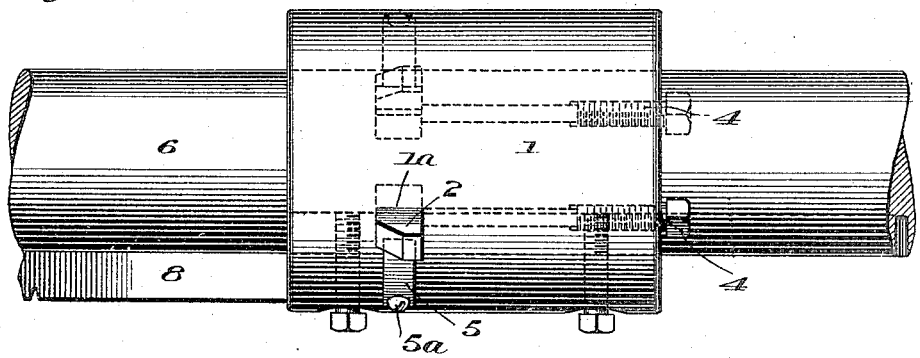
Figure 1 is a side view of a holder and cutters therein and the cutter adjusting and fastening devices.

In the embodiment of the invention shown in the drawings the tool holder 1 is slidably mounted upon a supporting bar 6 and can be slid thereon during the boring operation by means of a rack bar 8 and operating means substantially as shown and described in the Bechman patents aforesaid.

Figure 3:
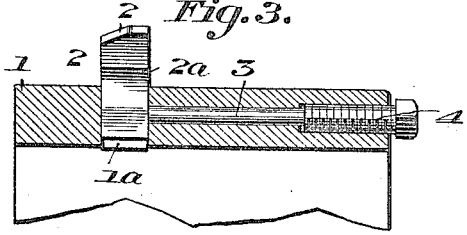
Fig. 3 is a detail longitudinal section of the cutter head on line 3—3 Fig. 2.

The tool holder is provided with radial slots $1^a$, according to the number of cutters to be employed, two diametrically opposite slots being shown. In each slot is mounted a radially adjustable cutter 2 the shank of which fits easily in the slot. These cutters may be securely fastened in the slots by any suitable means. As shown in Fig. 3 they are locked by means of clamp bolts or rods 3 lying in longitudinal bores in the holder 1, which rods may be forced endwise in the bores, so as to clamp the cutters, by means of their threaded portions 4 tapped into the internally threaded and enlarged outer end of the bores as indicated in Figs. 1 and 3.

Each cutter 2 has a notch $2^a$ in one side which is engaged by the free end of a spring plate 5, the other end of which is securely fastened to the holder, as by screws or bolts $5^a$. If the clamp rods be loosened the springs 5 will move the cutters radially outward.

Figure 2:
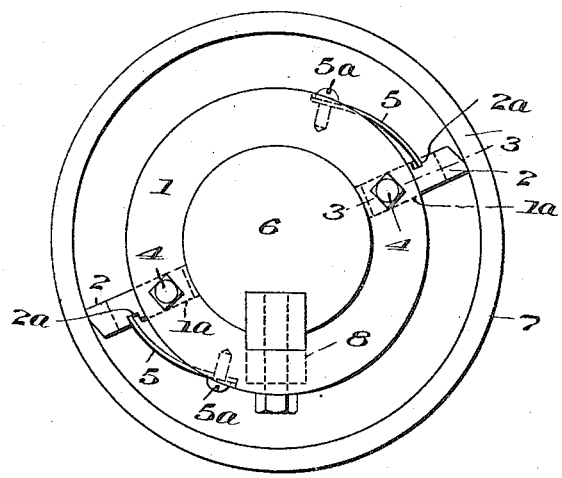
Fig. 2 is an end view of the holder, also showing the cutter gage ring in position relative thereto.

In setting the cutters the holder and cutters are positioned axially within a gage ring 7, the inner diameter of which exactly corresponds with the inner diameter which the finished stereotype plate is to have; and this gage ring 7 may be positioned, in any suitable manner, in exact position around the holder 1, as indicated in Fig. 2, as by inserting it in the end of the stereotype plate-holder of the machine (not shown). The gage-ring is preferably of the same thickness that the stereotype plate should be when bored. The outer periphery of the gage-ring fits accurately within and against the inner periphery of the bore of the stereotype plate holder (such as shown in my aforesaid patents) so that said gage-ring can easily be placed in position by inserting it in the bore of the plate holder; and when inserted therein the gage-ring will be properly positioned around the holder 1. The cutters are then released by loosening the clamp bolts, and springs 5 move the cutters radially outward until their cutting edges engage the inner periphery of the gage 7; then the clamp bolts are screwed home, so as to bind the cutters 2 securely in adjusted position. Then the gage ring 7 can be removed, or the holder and cutter moved out of the gage ring; and the cutters are then ready for work.

By simply properly positioning the cutter head relative to the gage ring and releasing the cutters the springs will automatically move the cutters to exact operative position, then the cutters can be fastened and no measurements have to be made by the attendant or workman when adjusting the cutters radially.

What I claim is:

1. In combination, a holder, an adjustable cutter therein, a spring adapted to project the cutter when the latter is released; and means for fastening the cutter.

2. In combination, a holder, an adjustable cutter thereon, a spring adapted to project the cutter when the latter is released; and means for fastening the cutter; with a removable gage adapted to limit the projection of the cutter when released.

3. In combination, a holder, a plurality of cutters mounted thereon; springs adapted to project the cutters when they are released; and means for fastening the cutters.

4. In combination, a cutter head, a plurality of cutters mounted thereon, springs adapted to project the cutters when the cutters are released; and means for fastening the cutters; with a removable gage adapted to limit the projection of the cutters when released.

5. In a machine for boring tubular plates the combination of a cutter head having radial slots, cutters mounted in said slots and movable independently radially of the cutter head, springs for projecting the cutters when the latter are released, and means for fastening the cutters in position.

6. In a machine for boring tubular plates the combination of a cutter head having radial slots, radially independently movable cutters mounted in said slots, springs engaging and adapted to project the cutters when the latter are unfastened; and means for fastening the cutters in position; with a removable gage for limiting the projection of the cutters by the springs when they are released by the fastening means.

7. In a machine for boring tubular plates the combination of a cutter head having radial slots, cutters independently mounted in said slots and movable radially of the cutter head, springs for projecting the cutters, and bolts for fastening the cutters in position; with a removable circular gage for limiting the projection of the cutters by the springs when they are released by the fastening bolts.

In testimony that I claim the foregoing as my own, I affix my signature.

LOUIS H. BECHMAN.

Copies of this patent may be obtained for five cents each, by addressing the "Commissioner of Patents, Washington, D. C."